United States Patent [19]

Hedlund et al.

[11] 4,395,738

[45] Jul. 26, 1983

[54] HELICAL SCAN TAPE RECORDING AND/OR REPLAY APPARATUS

[75] Inventors: Lee V. Hedlund, Maple Shade; Donald G. Herzog, Collingswood, both of N.J.

[73] Assignee: RCA Corporation, New York, N.Y.

[21] Appl. No.: 210,788

[22] Filed: Nov. 26, 1980

[51] Int. Cl.³ ............................................. A04N 5/76
[52] U.S. Cl. ...................................... 358/335; 360/9.1; 360/32; 360/33.1
[58] Field of Search ................... 360/33, 32, 22, 23, 360/9, 72.2, 48, 33.1, 9.1, 10.1, 10.3; 358/127, 335, 78

[56] References Cited

U.S. PATENT DOCUMENTS

| 3,599,178 | 8/1971 | Jackson | 358/102 |
| 3,921,132 | 11/1975 | Baldwin | 360/33 |
| 4,041,453 | 8/1977 | Umeda | 360/38 |
| 4,277,807 | 7/1981 | Baldwin | 360/32 |

Primary Examiner—Alan Faber
Attorney, Agent, or Firm—E. M. Whitacre; W. H. Meise; H. I. Steckler

[57] ABSTRACT

A tape has a format of the type wherein digital video information is recorded with each frame or field disposed on a set of multiple tracks and with at least one track being intended for replay during scene search modes of operation, only the most significant bits of pixels are recorded on the search tracks.

1 Claim, 3 Drawing Figures

HELICAL SCAN TAPE RECORDING AND/OR REPLAY APPARATUS

BACKGROUND OF THE INVENTION

This invention relates to a digital video record and/or replay helical scan system wherein each frame or field is recorded on a set of multiple tape tracks. During a search mode of such systems, the recorded medium is replayed from the sequential multiple track sets and each frame or field is reconstructed from information recorded for many frames or fields. Tape speed during search modes can vary anywhere from normal replay speed to many times normal replay speed in both the forward and reverse direction. Although conventional techniques are known for operating in a search mode, difficulties are encountered with these techniques for two reasons. First, when the tape varies from normal replay speed, the timing necessary to reorganize information picked up from sequential sets of multiple tracks into a recognizable signal, is very complex. Second, it is desirable to only pickup information from less than the full number of tracks in each multiple set such as one track, so that the mechanical and electronic aspects of the record and/or replay system may be simplified.

SUMMARY OF THE INVENTION

To enhance scene recognition during the search mode, only the more significant bits of picture samples are recorded on at least one search track of each multiple set in the record and replay system of this invention. In one preferred embodiment, the picture samples (pixels) represented on the search tracks relate to only a portion of the video information.

DESCRIPTION OF THE PREFERRED EMBODIMENTS

In helical scan record and replay systems, a set of multiple tracks may be used to record each raster frame or field. By replaying the recorded medium at speeds above the normal replay speed, a scene search mode is performed with such systems. During this mode, portions of many recorded frames are reconstructed into each search frame. In one proposed digital system, information is replayed from only a single track of each set during a scene search mode. This search track is first recorded with a transducer having a gap disposed at a unique angle relative to the tranducers for the other tracks in each multiple track set. Then during a scene search mode, the search track is replayed with a transducer having the same uniquely disposed gap angle. This invention enhances picture quality during the scene search modes of such digital record and replay systems by recording only the most significant bits of picture samples (pixels) on at least one search track. Therefore, a greater number of pixels from each recorded frame can be represented on the search tracks and consequently, each reconstructed frame during the scene search mode will contain more video spatial detail or resolution, although with reduced amplitude resolution.

As will be discussed hereinafter, known mechanical and electronic hardware is available which can be arranged to either record the most significant bits of pixels on the search tracks in the multiple track set or replay those most significant bits from those tracks during a scene search mode. Since search mode capability is most commonly found in systems having both record and replay capabilities, both record and replay functions will generally be discussed for the invention. However, those skilled in the art will realize without any further explanation that the record and replay functions could be performed by separate and distinct subsystems and a tape format in accordance with the invention would be recorded in one subsystem and replayed in the other subsystem.

Figure 1:
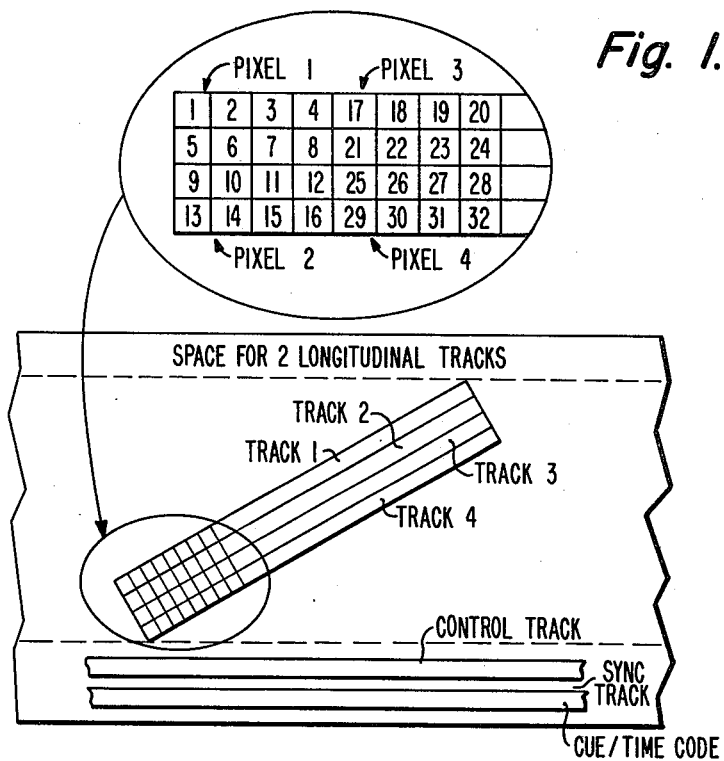
FIG. 1 illustrates the tape track format in one preferred embodiment of the invention, with a portion of that format being expanded in a separate view.

One preferred tape format for use in the record and replay system of this invention is illustrated in FIG. 1 where every other pixel of the video information is represented by information recorded on tracks 1 and 2. Track 1 is arbitrarily selected as the search track. For purposes of discussion only, four tracks are included in the multiple track set and eight bits are included in each pixel. An expanded view of a multiple track set segment is shown in FIG. 1 and four consecutive pixels 1 through 4 having their bits numbered sequentially from 1 to 32, are illustrated in this view. Four bits (1–4; 9–12; 17–20 and 25–28) in each pixel are the most significant bits and four bits (5–8; 13–16; 21–24; 29–32) in each pixel are the least significant bits. Of each pixel, the first four bits are the most significant bits while the last four bits are the least significant bits. Furthermore, each odd numbered pixel is recorded on tracks 1 and 2 while each even numbered pixel is recorded on tracks 3 and 4. Except for the details of the invention, FIG. 1 relates generally to the conventional SMPTE type C format and therefore, the space along the edge of the tape is reserved for longitudinal tracks which include audio tracks, a control track and a sync track.

Those skilled in the art will of course realize without further explanation that the track format of this invention is not limited to the track format of FIG. 1. It should be readily understood that the number of most significant bits could be limited so that every pixel, rather than every other pixel, could be represented on the search tracks. Furthermore, the number of tracks in each multiple track set could be greater or less than four and the number of bits in each pixel could be greater or less than eight to achieve various results.

Under normal replay conditions, each frame is reconstructed from its multiple track set in the format of FIG. 1 by replaying all of the bits for each pixel in their recorded sequence. As mentioned previously however, each frame is reconstructed from portions of several recorded frames during a scene search mode. This is accomplished by replaying information only from the search tracks (Track 1) in each of the multiple track sets that relate to those recorded frames. Because only the most significant bits of pixels are disposed on this search track, more pixel information relating to each recorded frame is replayed during a scene search mode than would be the case if track 1 included all bits of each pixel, and, therefore, the reconstructed search picture includes more detail than would be possible with other scene search mode techniques.

Figure 2:
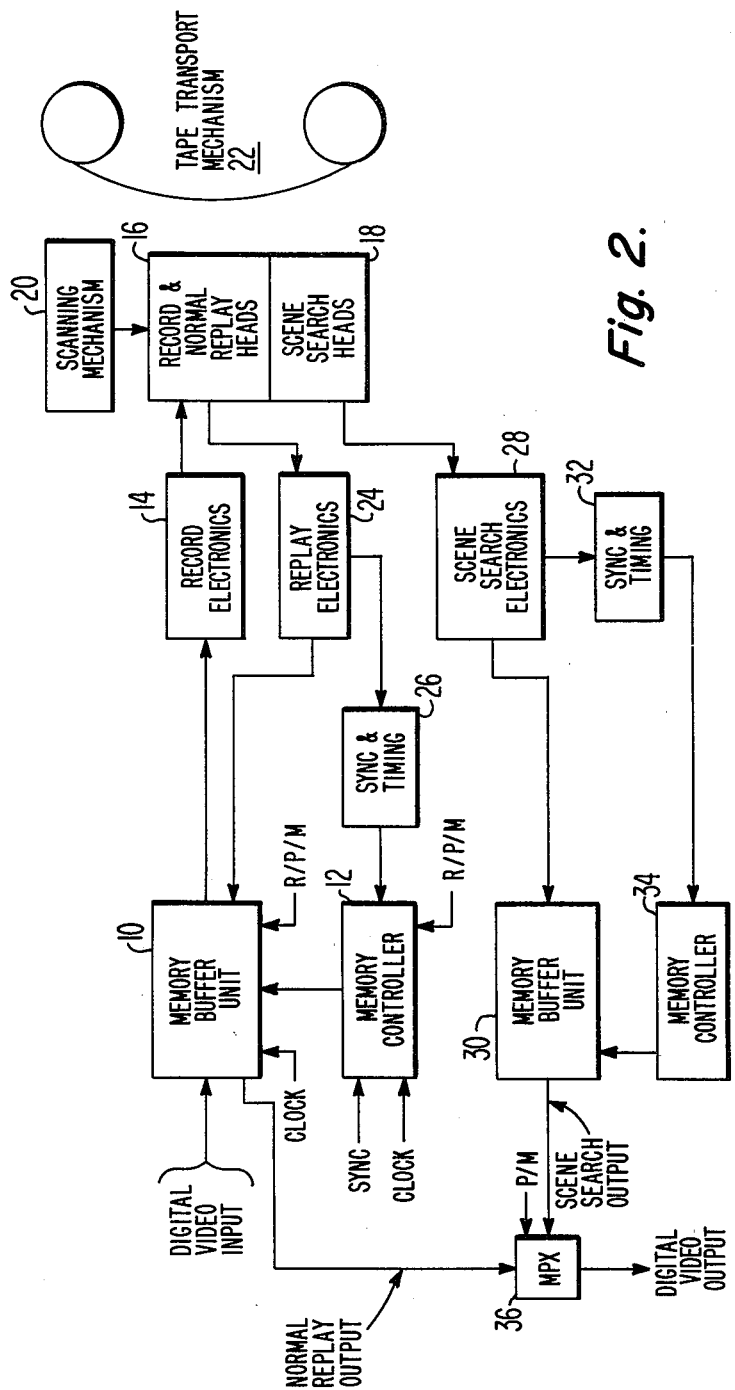
FIG. 2 is a block diagram of a tape record and replay system (not shown in its entirety) for utilizing the track format of FIG. 1.

A record and replay system utilizing the tape format of this invention must include a digital means for recording pixel information with the most significant bits and the least significant bits thereof on separate tracks and a digital means for replaying that pixel information during both the normal replay and a scene search mode. Embodiments of such digital record means and digital replay means are shown in FIG. 2 which is directed to the tape format of FIG. 1 to facilitate an understanding of these embodiments. The digital video is supplied to a memory buffer unit 10 which is capable of storing an appropriate amount of digitized pixel information and re-ordering the bits for each pixel and the sequence of pixels. A memory controller 12 derives its basic timing and initialization from an external clock and video sync information. The memory controller 12 manages the organization of the pixel information and the bit information constituting each pixel at the output of the memory buffer unit 10. Both the memory buffer unit 10 and the memory controller unit 12 are capable of operating in the inverse manner to provide the inverse ordering and timing during the playback mode as detailed below. Mode selection is via a record/play/moviola control bus (R/P/M). The output of the memory buffer unit 10 is organized to provide the number (N) of output lines equal to the number of record channels and heads. In the exemplary format shown in FIG. 1 in which four signal tracks are recorded the number of output lines would equal 4. The output of buffer unit 10 is coupled to a record electronics unit 14 which converts the digitized information from the memory buffer unit 10 to signal levels and characteristics consistent with magnetic record and replay heads 16.

The magnetic heads 16 are equal in number to the number (N) of recorded tracks required to support the format. It is possible to have a common record/replay head or it is possible to have separate record and separate replay heads. The record/replay heads 16 and moviola heads 18 are mounted on an appropriate scanning mechanism 20 which translates the magnetic heads 16 and 18 across the tape to produce the desired scanning format. A tape transport mechanism 22 moves the tape in an appropriate manner past the scanning mechanism 20. In general, record and replay are done at a fixed tape transport speed however, signals picked up by the magnetic heads 16 during replay are coupled to replay electronics 24 which converts those signals to digitized information which is directed to the buffer unit 10. The replay electronics 24 also directs information to a sync and timing extractor 26 which applies signals to the memory controller 12, which determines the organization of the replayed information within the buffer unit 10.

During search mode (moviola) it is important to obtain pictorial information of reasonable quality when the tape velocity is increased sometimes as much as 50:1 in the current art. The moviola heads 18 are, therefore, scanned across many tracks deriving only a small portion of the information about each frame, such as from track 1 in the format of FIG. 1. However, the information scanned must be synchronized such that the resulting image produced with one scan is composed of perhaps 10 frames if the tape speed is moved at 10:1 speed increase over the recording speed. The output of the moviola heads 18 is applied to scene search electronics 28 which converts the head currents to appropriate digitized standards and applies its output to another memory buffer unit 30. Synchronization, timing and clock extraction are obtained from a sync and timing extractor 32 and applied to a memory controller 34. Memory controller 34 manages and controls the organization of the memory buffer unit 30, providing as an output scene search pictorial information which is synchronized, timed and contains digitized video in the same format as the normal input video format. Both the normal replay and scene search replay digital video outputs from the memory buffer units 10 and 30 are directed to a multiplexer 36 from which the information to be replayed is taken in accordance with the replay mode of operation selected.

Figure 3:
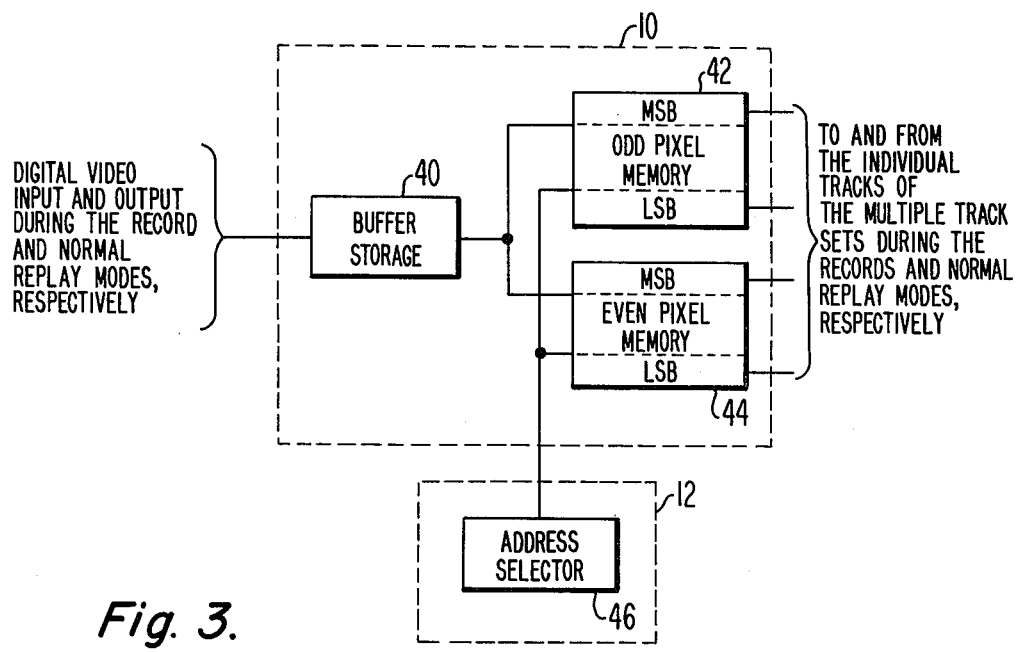
FIG. 3 is a block diagram of a specific memory buffer unit arrangement for use with the tape format of FIG. 1.

Digital video is applied to memory buffer unit 10 when recording and taken therefrom during normal replay. One convenient arrangement of the memory buffer unit 10 for the multiple track set of the tape format in FIG. 1 is illustrated in FIG. 3. Digital video pixels such as in eight bit parallel format are applied in sequence to a buffer storage 40 within the buffer memory unit 10. In their parallel bit format, these pixels are directed in alternate sequence from the buffer storage 40 to an odd pixel memory 42 and an even pixel memory 44 under the control of an address selector 46 within memory controller 12. The bits of the pixels are segregated into locations for the most significant bits (MSB) and the least significant bits (LSB) in the memories 40 and 42. When recording, these pixel bits are directed concurrently in serial format from their MSB and LSB locations in both memories 40 and 42 to the individual tracks of the multiple track sets through the record electronics 14. During normal replay, pixel bits are directed concurrently in serial format from the individual tracks of the multiple track sets to their MSB and LSB locations in both memories 40 and 42 through the replay electronics 24. Of course, only MSB are processed during scene search replay and therefore, those pixel bits are directed concurrently in serial format from the search track or tracks to the memory buffer unit 30 through the scene search electronics 28.

Other embodiments of the invention will be apparent to those skilled in the art. In particular, more than one track containing most significant bits may be accessed in the search mode.

What we claim is:

1. In a record and replay system of the type wherein digital video information is recorded with each field or frame disposed on a set of multiple tracks and with only a single track being intended for replay during scene search modes, the improvement comprising:

a first memory buffer unit which directs the most significant bits and the least significant bits of pixels to separate tracks through record electronics during the record mode of operation and directs those pixel bits from the tracks of operation, said first memory buffer unit being controlled by a first memory controller and having clock and mode select signals applied thereto, said memory controller having said mode select signal applied thereto as well as clock and sync signals during the record mode of operation or sync and timing signals from said replay electronics during the normal replay mode of operation;

a second memory buffer unit which directs only the most significant bits of pixels from the tracks through scene search electronics during scene search replay modes of operation, said second memory buffer unit being controlled by a second memory controller and having sync and timing signals applied thereto from said scene search electronics; and a multiplexer which directs pixel bits from either said first or second buffer memory units during normal replay or scene search replay respectively.

* * * * *